March 12, 1940.  C. H. WHITE  2,192,947
PLANTER
Original Filed Jan. 18, 1936  2 Sheets-Sheet 1
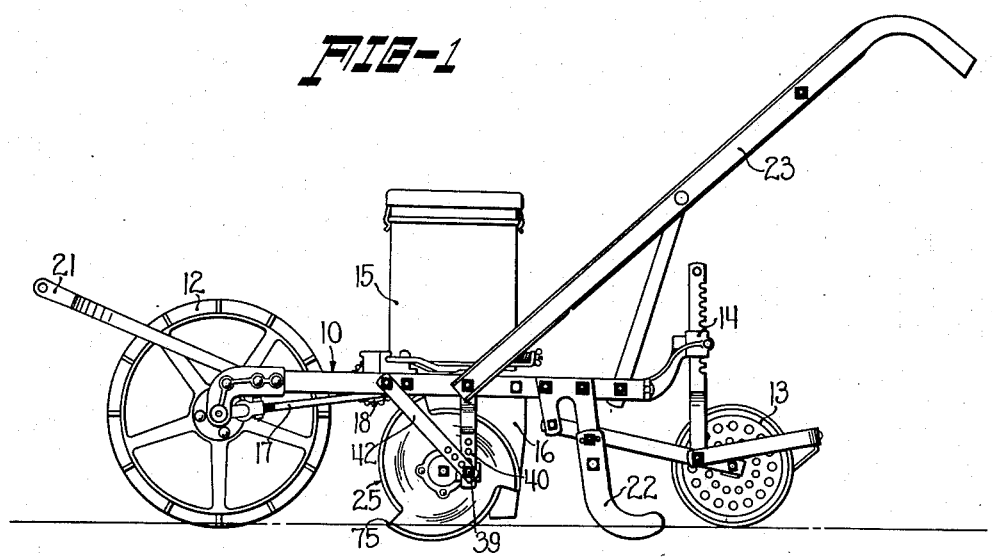
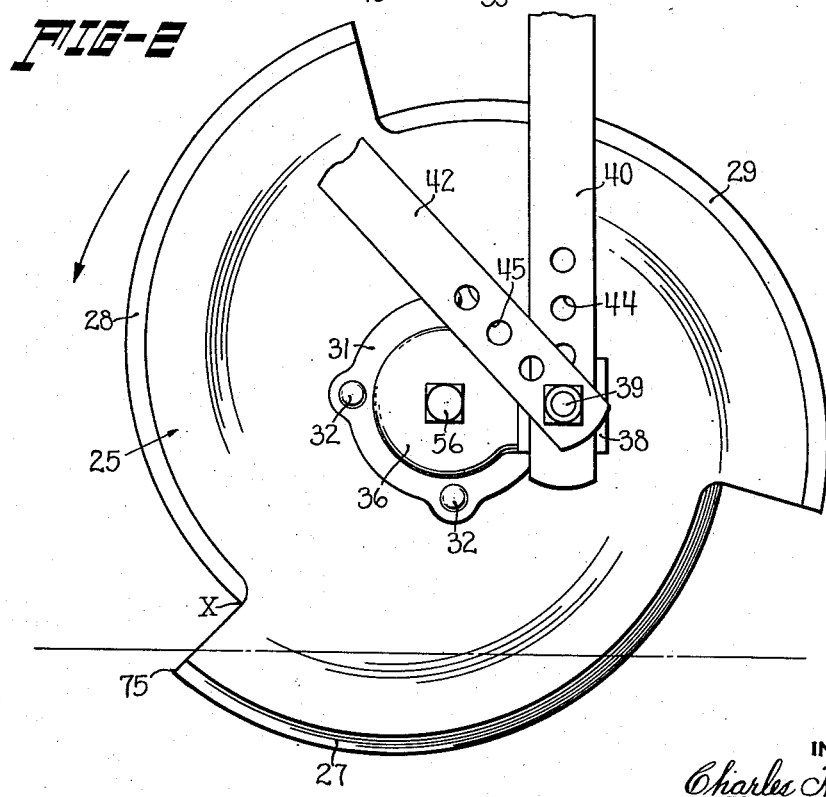
INVENTOR
Charles H. White
BY
Brown, Jackson, Boettcher & Dienner
ATTORNEYS.

March 12, 1940.  C. H. WHITE  2,192,947
PLANTER
Original Filed Jan. 18, 1936   2 Sheets-Sheet 2
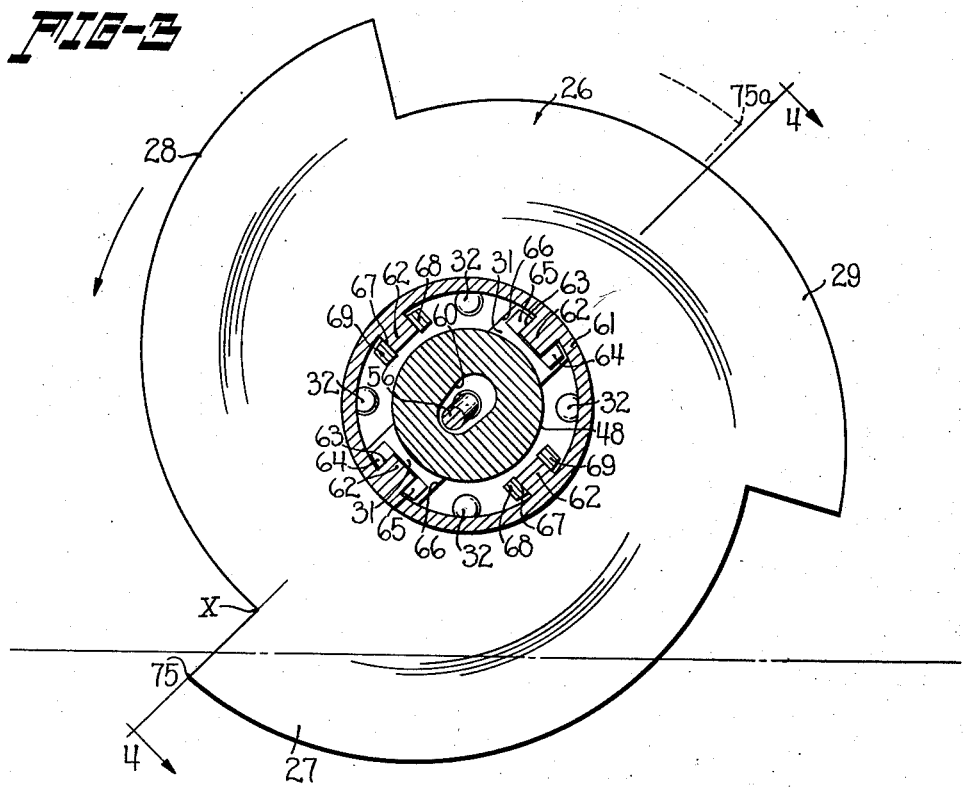
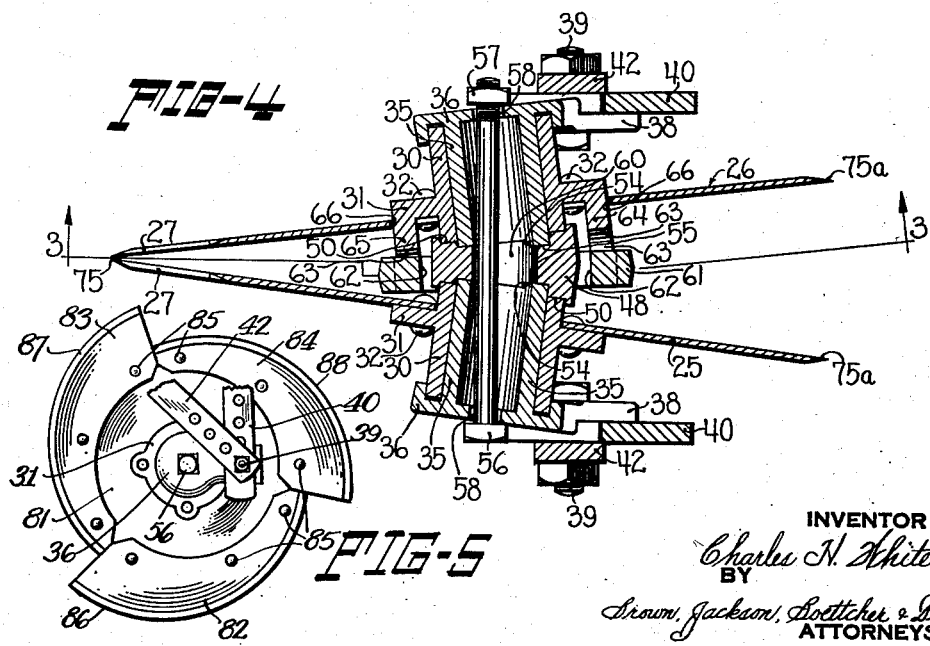
INVENTOR
Charles N. White
BY
Brown, Jackson, Boettcher & Dienner
ATTORNEYS.

Patented Mar. 12, 1940

2,192,947

UNITED STATES PATENT OFFICE 2,192,947

PLANTER

Charles H. White, Moline, Ill., assignor to Deere & Company, Moline, Ill., a corporation of Illinois Application January 18, 1936, Serial No. 59,646
Renewed January 14, 1938

11 Claims. (Cl. 111—88)

The present invention relates to planters, and more particularly to implements of this character provided with means for planting the seed at variable depths.

It has been found by experience that when seed is all planted at the same depth, unexpected changes in climatic conditions may produce a poor stand of plants, with resultant loss to the farmer. For instance, in the planting of seed all at the same depth, if it is planted shallow and the rainfall is light, the seed will not sprout; and if the seed is planted deep and the rainfall is heavy, the seed will rot. It will be seen, therefore, that when planting with a uniform depth planter unless the farmer has been able to properly judge the weather conditions that will ensue after planting and has chosen the proper depth at which to plant his seed for such weather conditions, a very poor stand of plants, or no stand at all, will be the result. This, of course, would necessitate a second or late planting, which is not desirable.

It is also customary in the planting of seed with uniform depth planters, and also with variable depth planters, to plant many more seed than the number of plants desired, and if more than the desired number of plants grow, to chop out the excess, and while in the past many attempts have been made to provide a variable depth planter whereby some of the seed will sprout regardless of climatic conditions, such planters have not proved entirely successful. In one type of variable depth planter with which I am familiar, seed are planted at shallow and deep levels and also at levels between such shallow and deep planting levels and in the use of such devices the space intervals occurring between corresponding planting levels vary considerably and are not equal, thus producing an uneven spacing between the respective yielding hills when chopping to a normal stand is completed. Other planters provide only for planting the seed at two levels, one shallow and one deep, and such implements are objectionable in that no provision is made for planting seed at various levels between such shallow and deep planting levels.

With the above in view it is the principal object of the present invention to provide a planter with a furrow opener that will cut a furrow of variable depth whereby some seed may be planted shallow just below the ground surface, some seed deep, about one and a half or two inches below the ground surface, and some seed at different depths between the shallow and deep plantings, whereby some of the seed will be planted at just the proper depth for practically any amount of rainfall that may be had.

It is another object of the present invention to provide a variable depth planter with a planting mechanism that will plant no more seed than is planted with the ordinary uniform depth planter, whereby much of the labor of chopping out the excess plants is saved.

Another object of the present invention is the provision of a variable depth planter having a rolling furrow opener so constructed and arranged to form a furrow of variable depth before the dropping of the seed therein and while moving bodily forward in a straight line of advance.

A further object of the invention is to provide a variable depth planter of this type with the spacing between seeds planted at the same depth equal, or aproximately equal, to that desired between the several hills of the stand, whereby the spaces between the several hills will be approximately the same.

A still further object of the present invention is to provide a variable depth planter with a furrow opener that will have all the advantages of a double disc furrow opener in that the leading or ground-approaching edge of each disc, while conjugate with the corresponding edge of the companion disc, cooperates with the latter in opening a furrow, and as the corresponding edges spread apart in completing their revolution they function as a heel to open the furrow and keep clod from disturbing or falling into the furrow while being formed.

Another object of the present invention is the provision of means for causing the discs to rotate in unison and in constant angular relation so that the corresponding edges retain constant registration.

Other objects and advantageous features will appear from the following description of the preferred embodiment of my invention, taken in connection with the accompanying drawings, in which—

Figure 1 is a side elevational view of a conventional form of planter equipped with my improved variable depth furrow opener;

Figure 2 is a side elevational view on an enlarged scale of the improved furrow opener;

Figure 3 is a vertical cross-sectional view on an enlarged scale illustrating one of the furrow opener discs and its supporting means, taken on the plane of the line 3—3 of Figure 4;

Figure 4 is a cross-sectional view on an enlarged scale taken on the plane of the line 4—4 of Figure 3 and illustrating the two furrow opener discs and the means for connecting them together to rotate in unison and for supporting them on the planter; and Figure 5 is a view, similar to Figure 2, showing a modified form of furrow opener.

Referring to the drawings, the planter illustrated is of the conventional one-row walking type, and as shown it comprises a main frame, indicated as an entirety by the numeral 10, supported on a front drive wheel 12 and rear covering or press wheels 13, the latter being connected with the main frame 10 by depth adjusting means 14. Suitably supported on the main frame is a seed hopper 15 within the lower portion of which is supported the usual seed dropping mechanism (not shown) which delivers the seed to the seed spout 16 in the usual manner. This seed dropping mechanism is driven by suitable driving mechanism, such as cranks 17, connected with and operated by power from the front drive wheel 12, in the illustrated construction the gear 18 being a representative part of the seeding device. The reference numeral 21 indicates the usual hitch connection or clevis for connecting the planter with suitable draft means. The numeral 22 indicates the usual knife coverer which operates to cover the furrow that has been opened by the furrow opener to be hereinafter described, and 23 indicates the handle by which the operator controls the planter. It is believed that the foregoing brief description will be sufficient for an understanding of the main or conventional parts of the planter in which the principles of the present invention have been embodied.

The furrow opener with which the present invention is more particularly concerned comprises a pair of discs 25 and 26. This furrow opener resembles the double disc furrow opener commonly used on grain drills in that the leading or ground-approaching edge of each disc, while conjugate with the corresponding edge of the companion disc, cuts a furrow and, as the co-operating edges spread apart in completing their revolution, they function as a heel to open the furrow and keep clods of earth from disturbing the furrow while it is being formed. This furrow opener differs from the ordinary double disc furrow opener, however, in that the edge of each disc is eccentrically formed to define a series of involute curved cutting edges or sections 27, 28 and 29 disposed uniformly around the periphery of the disc, said eccentrically formed involute curved cutting edges corresponding to the desired variation in the depth of planting.

In this connection, however, it is well to point out here that while in the illustrated construction I have shown each of the discs as provided with three involute curved cutting edges 27, 28 and 29, the number of such cutting edges may be varied, as may also the diameter of the discs, depending on the spacing desired between corresponding planting depths. That is to say, if it is desirable in the planting of certain seeds, such as cotton, to limit the spacing between points of corresponding planting depths to a distance in the nature of 8 or 10 inches, the number of cutting divisions defining the desired range of such planting depths may be varied according to the maximum diameter of the discs. Or, in other words, where one diameter of disc would require three involute curved cutting edges 27, 28 and 29 as illustrated, a disc of larger diameter would require four or more of such curved cutting edges in order to provide the same spacing between corresponding planting depths. Therefore, while the drawings illustrate a furrow opener with three eccentrically formed involute curved cutting edges or divisions, it would be equally efficient in a disc of different diameters to have a proportionate number of cutting divisions, and applicant, therefore, is not to be limited to the specific construction shown and described in the accompanying drawings, as the invention in its broader aspects covers the use of discs or the equivalent of various diameters with corresponding variations in the number of such eccentrically formed uniform involute curved cutting edges or divisions.

The two discs 25 and 26 forming the furrow opener of the present invention are held in constant angular relation to each other so that corresponding edges of the discs retain constant registration at all times, and the means for mounting the discs and so holding them in position will now be described.

As best shown in Figure 4, each of the discs is provided with a central hub member 30 having a circumferential flange 31, the flange being secured to the outer face of the disc by means of a plurality of rivets 32. Each of the hub members 30 is journaled upon a bearing member 35. Cast integral with each of said bearing members 35 is a cap member 36, the cap members overlying the outer ends of the central hub members 30 and thereby preventing the admission of dirt between the hub members 30 and the bearing members 35. The cap members 36 also provide means for connecting the furrow opener assembly to the supporting frame of the planter, and to this end said cap members 36 are each provided with an integrally formed rearwardly extending horizontal bracket 38 that is fixed, as by a bolt 39, to the lower end portion of a vertically extending supporting member or bar 40 rigidly secured at its upper end to the planter frame 10 in any suitable manner. A suitable diagonally extending brace member 42 cooperates with each of the bars 40 to aid in supporting the furrow opener from the frame 10 and to hold it in proper position. If desired, the supporting members 40 and the brace members 42 may be provided with a plurality of openings 44 and 45, respectively, to provide for various vertical adjustments of the furrow opener relative to the frame 10, as will be readily understood.

The hub members 30 are maintained in definite axial angularity by a cylindrical block 48 which is interposed between the hub members 30 of the two discs 25 and 26 in non-rotatable relation, as shown in Figure 4, said block being provided with annular grooves or recesses 50 in its outer ends adjacent its periphery. The edges of the grooves 50 overlap and seal the inner ends of the hub members 30 against the admission of dirt thereto as shown in Figure 4. Each of the bearing members 35 is provided with a lug 54 which cooperates with a recess 55 formed in the cylindrical block 48, whereby the plane of the angle between the bearings relative to the ground may be fixed, and also to lock the block in position between the bearing members 35 of the discs 25 and 26. The bearing members 35 and the block 48 are fixed together and held against outward axial displacement by a bolt 56 passing through enlarged openings 58 in the cap members 36 and through an elongated slot 60 formed in the block 48 and locked in position by a nut 57. Thus, the two bearing members and the block 48 are held rigidly together to form journal means restraining the discs 25 and 26 so that they rotate, respectively, in planes disposed at an angle to one another and so spaced apart in a generally axial direction that the radially outermost portions of the discs are in actual contact, or approximately so, as these portions of the discs approach the plane represented by the line 4—4 of Figure 3 and which contains the angularly disposed axes of rotation of the respective discs 25 and 26. It is to be noted, further, that the connection between the bearing members 35 and the frame members 40 is such that the last mentioned plane intersects the ground at approximately the point where the forwardmost portions of the discs enter the ground in the normal operation of the planter. Since the discs 25 and 26 are substantially in contact at this point, the two discs serve, in effect, as a single knife edge splitting the soil and beginning the opening of the furrow.

As shown in Figures 3 and 4, a floating ring 61 encircles the block 48 and is provided with four equally spaced radially inwardly directed ears 62. Two of said ears are adapted to simultaneously engage in recesses 63 (Figure 4) formed by two diametrically opposed pairs of lugs 64 and 65 that are formed integral with the circumferential flange 31 of the hub member 30 of the disc 26 and project inwardly through slotted openings 66 provided in said disc, while the other two of said ears 62 are adapted to simultaneously engage in recesses 67 (Figure 3) formed by diametrically opposed pairs of lugs 68 and 69 that are formed integral with the circumferential flange 31 of the hub member 30 of the disc 25 and project inwardly through openings provided in said disc similar to the openings 66 in the disc 26. The pairs of lugs 64 and 65 associated with the disc 26 are so spaced relative to the lugs 68 and 69 associated with the disc 25 that an axis defined by a line drawn between the two pairs of lugs on one disc intersects at right angles the axis defined by a line drawn between the two pairs of lugs on the other disc. Therefore, even though the angular axial movement of the discs will displace the lugs of one disc with respect to the lugs on the other disc, the common circumferential plane of the four ears 62 on the floating ring furnishes a constant interconnection of the two sets of lugs on the respective discs. Thus, free rotation, in unison, of the hub members 30 and the two discs 25 and 26 is maintained without one disc slipping relative to the other.

The operation of my improved planter, after the furrow opener is first adjusted relative to the planter frame by means of the bolts 39 which are inserted in the proper openings 44 and 45 of the bars 40 and 42, respectively, so that the furrow opener will penetrate into the ground to the desired depth, is substantially as follows:

As the planter is propelled forwardly, the wheel 12 is caused to rotate by its contact with the earth, and as a result the seed selecting and depositing mechanism drops a series of relatively closely spaced seed one at a time. The forward travel of the planter also causes the discs 25 and 26 to roll, portions thereof entering the ground at various depths while the furrow opener as a whole moves in a straight line at a given height of operation depending upon the adjustment of the covering or press wheels 14. As mentioned above, the bearing members 35 are so connected with the frame of the planter that the plane (4—4 in Figure 3) containing the point of conjugation of the discs and the axes of rotation of the discs intersects the ground at practically exactly the point where the discs themselves enter the ground. Thus, as the planter moves forwardly, the discs revolve in a counterclockwise direction as shown by the arrows in Figures 2 and 3, with the leading or ground approaching edges of the discs disposed either in actual contact with one another or closely adjacent one another. For example, as the radially outermost tips of one of the peripheral sections of the discs approach and reach the plane 4—4 (Figure 3) they are actually in contact, as indicated at 75. However, as the planter moves forwardly and the discs 25 and 26 continue to roll in a counterclockwise direction, the points, formerly at 75 in the plane 4—4, now move away from said plane and so recede from one another. In doing this while they are still within the soil, they spread or widen the furrow and thus function as a heel to open the soil to the desired width. As the aforesaid points then leave the soil and approach the plane 4—4 at the side rearwardly of the axes of rotation, they are spread farther and farther apart until they reach their maximum position, indicated by dotted lines at 75ª in Figure 4. Thereafter, the continued forward rotation of the discs bring the aforesaid points closer and closer together until they are again in actual contact when they reach the plane 4—4 at the forward side of the furrow opener.

Thus, not only are the radially outermost tips of the two discs in actual or substantially contact at the forward or ground entering position, spreading farther apart as the discs continue to advance, but the same is true of every other pair of companion points of the two discs, that is, they are relatively close together at the point where they pass through the plane 4—4, where they begin to enter the ground, and they are then spread farther and farther apart as they recede from the point of entry. At the same time, they move deeper into the ground until they are directly underneath the axis of the furrow opener, and then they begin to leave the ground. However, they continue to be spread farther and farther apart.

As will be apparent, however, the points of the discs, indicated at 75, will enter the ground to a greater depth than any other portion. Thus, for example, as the involute curved cutting edges 27 of the first section of the furrow opener cut into the ground, owing to the contour of such cutting edges the furrow gradually increases in depth until the radially outermost portions 75 of the edges reach their lowermost point in the ground and have cut the deepest part of the furrow. However, immediately following the radially outermost edge portions 75 of the discs are the radially innermost portions, indicated at X in Figure 3, and as these portions enter the ground during the continued advance of the furrow opener they, too, are forced deeper into the ground until they are directly underneath the axis of rotation of the furrow opener. However, due to the radially innermost disposition, this portion of the furrow is the most shallow, but nevertheless as the points X continue to be rolled or rotated in a counterclockwise direction they are spread farther and farther apart, thus widening the furrow so long as they are in actual contact with the furrow. As they leave the soil, however, this portion of the soil is not quite so wide as the portion of the furrow at the points where the tips 75 left the ground. Thus, the various involute curved sections of the discs form a furrow having a plurality of sections of gradually varying depth, and the continued and steady deposit of the seed one at a time disposes the seed not only at a maximum and a minimum depth but at a considerable number of intermediate points between such maximum and minimum depths. After the deposit of seed at such varying depths, the furrow is closed by the knife coverers 22 and the press wheels 14. Adjustment of the latter, as by the means indicated by the reference numeral 14, raises or lowers the planting range but does not in any way affect the depth variations produced by the furrow opening discs 25 and 26.

In Figure 5 I have shown a modified form of furrow opener. This furrow opener is formed by two similar composite members each comprising a disc portion 81 carrying around the periphery thereof three separate shoes 82, 83 and 84, the shoes being secured to the disc in any suitable manner, as by rivets 85 as shown. The several shoes 82, 83 and 84 are so formed that when fixed in position around the periphery of the disc they define a series of involute curved cutting edges or sections 86, 87 and 88 similar to the curved cutting edges 27, 28 and 29 of the discs 25 and 26 illustrated in Figures 1 to 4.

I claim:

1. A planter comprising, in combination, a rotatable furrow opener comprising a pair of discs, and means for supporting said discs for rotation in constant angular relation to each other so that the edges of the discs are disposed closely adjacent to each other as they enter the ground and are spread apart as they move away from the point of entry in the revolution of the discs so as to function as a heel to widen the furrow, the edges of said discs being formed to define a plurality of generally involute curved cutting edges disposed uniformly around the periphery of the disc whereby the furrow cut by said discs comprises sections of variable depth.

2. A planter comprising, in combination, a frame, seeding mechanism carried thereby, a pair of discs, the edges of the discs being formed to define a plurality of generally involute curved cutting edges disposed uniformly around the periphery of the disc whereby the furrow cut by said discs comprises sections of variable depth, bearing means supporting said discs for rotation about axes disposed at an angle to one another, and means fixing said bearing means to the planter frame so that the plane containing the axes of rotation of said discs intersects the ground substantially at the point where the leading edges of the discs are conjugate and where they enter the ground.

3. A rotatable furrow opener for planters, comprising a pair of discs supported and positioned in such relation to each other as to jointly make a furrow of a width greater than the combined thickness of the two individual discs, the edges of the discs being formed to define a plurality of generally involute curved cutting edges disposed uniformly around the periphery of the disc whereby the furrow cut by said discs comprises sections of variable depth.

4. A rotatable furrow opener for planters comprising, in combination, a pair of discs, supported and positioned in such relation to each other as to jointly make a furrow of a width greater than the combined thickness of the two individual discs, the edges of the discs being formed to define a plurality of generally involute curved cutting edges disposed uniformly around the periphery of the discs, and means for holding the corresponding edges of said discs in constant lateral registration, whereby the furrow cut by said discs comprises sections of variable depth.

5. A rotatable furrow opener for planters and the like, comprising a pair of discs, a pair of angularly disposed bearing means rotatably supporting said discs for movement in intersecting planes, and means disposed between said discs and encircling said bearing means for causing said discs to rotate together.

6. A rotatable furrow opener for planters comprising, in combination, a pair of discs, a hub member for each of said discs, a bearing member for each of said hub members, and means interposed between said bearings and hub members for holding said discs in a given angular relation relative to each other, the edges of said discs being formed to define a plurality of generally involute curved cutting edges disposed uniformly around the periphery of the discs whereby the furrow cut by said discs comprises sections of variable depth.

7. A rotatable furrow opener for planters comprising, in combination, a pair of discs, a hub member for each of said discs, a bearing member for each of said hub members, a block interposed between the bearing and hub member of one disc and those of the other disc for holding said discs in proper angular relation relative to each other, a floating ring encircling said block, and means carried by said ring and cooperating with means carried by said hubs hubs for providing a constant inter-connection between the hub members of the two discs whereby said discs rotate in unison, the edges of the discs being formed to define a plurality of involute curved cutting edges disposed uniformly around the periphery of the discs whereby the furrow cut by said discs comprises sections of variable depth.

8. A rotatable furrow opener for planters comprising, in combination, a pair of discs supported and positioned in such relation to each other as to jointly make a furrow of a width greater than the combined thickness of the two individual discs, the edges of the discs being formed to define a plurality of generally involute curved cutting edges disposed uniformly around the periphery of the discs, and means for holding the corresponding edges of said discs in constant lateral registration with the radially extended portions angled toward one another in the furrow forming zone, whereby the furrow cut by said discs comprises sections of variable depth with the deeper sections more narrow than the more shallow sections.

9. A planter comprising, in combination, a rotatable furrow opener comprising a pair of discs, and means for supporting said discs for rotation in constant angular relation to each other so that the edges of the discs are disposed closely adjacent to each other as they enter the ground and are spread apart as they move away from the point of entry in the revolution of the discs so as to function as a heel to widen the furrow, said discs having irregular ground engaging portions disposed uniformly around the periphery thereof whereby the furrow cut by said discs comprises sections of variable depth.

10. A planter comprising, in combination, a frame, seeding mechanism carried thereby, a pair of discs, the peripheral portions of the discs being formed to cut a furrow having sections of variable depth, bearing means supporting said discs for rotation about axes disposed at an angle to one another, and means fixing said bearing means to the planter frame so that the plane containing the axes of rotation of said discs intersects the ground substantially at the point where the leading edges of the discs are conjugate and where they enter the ground.

11. A rotatable furrow opener for planters, comprising a pair of discs supported and positioned in such relation to each other as to jointly make a furrow of a width greater than the combined thickness of the two individual discs, the peripheral portions of the discs being formed to cut a furrow of variable depth.

CHARLES H. WHITE.